Aug. 16, 1955     H. R. LANGE     2,715,453

AIR FILTER UNIT

Filed June 21, 1952

INVENTOR.
HORACE R. LANGE
BY
Morgan, Finnegan & Durham
ATTORNEYS

United States Patent Office 2,715,453
Patented Aug. 16, 1955

2,715,453

AIR FILTER UNIT

Horace R. Lange, Yonkers, N. Y., assignor to Air Filters Company, New York, N. Y., a partnership of New York Application June 21, 1952, Serial No. 294,765

4 Claims. (Cl. 183—44)

This invention relates to filter units having utility as a means for removing solid particles entrained in a stream of gas flowing therethrough and relates more particularly to certain new and useful improvements in such filter units and in methods of fabricating such units.

Objects and advantages of the invention will be set forth in part hereinafter and in part will be obvious herefrom, or may be learned by practice with the invention, the same being realized and attained by means of the steps, combinations and improvements pointed out in the appended claims.

The invention consists in the novel processes, combinations and improvements herein shown and described.

The accompanying drawing, referred to herein and constituting a part hereof, illustrates embodiments of apparatus in accordance with this invention and, together with the description, serves to explain the principles of the invention.

Filter units for the purpose aforesaid are a normal component of window and room air-conditioning devices for domestic cooling, heating or ventilating purposes. The filtering medium is conventionally a mass of fibers such as glass wool coated with a tacky or cementitious substance, adapted to stop and retain foreign particles of dirt, dust, etc. in the air stream. Conventionally also, the filtering medium is advantageously in the form of a relatively thin unit, usually of rectangular configuration, which is sandwiched between a pair of suitably apertured metal retaining screens. The filter core thus formed is in turn enclosed within and by a jacket, envelope, or casing extending circumferentially of the assembly to hold the assembly parts together and, with them, to form a filter unit of substantial rigidity and strength.

The jacket is conventionally a two-part, box-like structure whose parts nest one within the other and are each fabricated from a number of individual strips of material such as chipboard, assembled and stapled together by hand. Likewise, the two parts after assembly into their jacket or casing form, with the core enclosed, are usually stapled to each other to form the desired unitary structure.

Filter units for use in conventional types of domestic air-conditioning units are dimensionally small and, in general, do not offer any substantial filtering surface. In consequence, they require replacement at rather frequent intervals and replacement cost becomes an item of considerable importance, particularly where a number of such units are being employed. It is, therefore, among the objects of this invention to enable economies to be effected in time, labor and material in the manufacture of such units through the provision of a new, useful and improved filter unit wherein the filter core is enclosed by a unitary jacket, envelope or casing fabricated from a single preformed marginally scored blank having marginal fold portions and a dimensionally suitable central aperture.

Of the drawings:

Fig. 1 is a view in plan of a preferred embodiment of a filter unit in accordance with this invention, a portion of the tape which masks the jacket being broken away in order to show details of the jacket corner construction more clearly, and a portion of the uppermost removable protective dust cover being broken away to show how the filter medium would be exposed through the underlying retaining screen, on removal of the cover;

Figure 1:
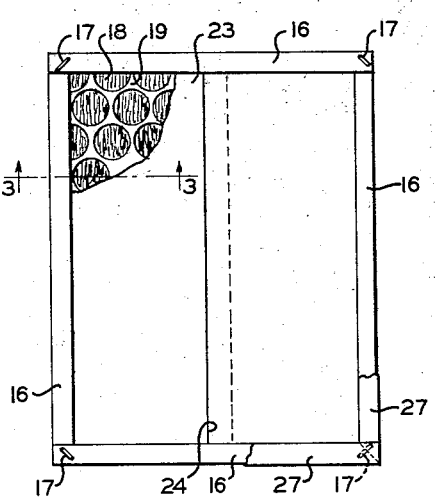
Figure 3:
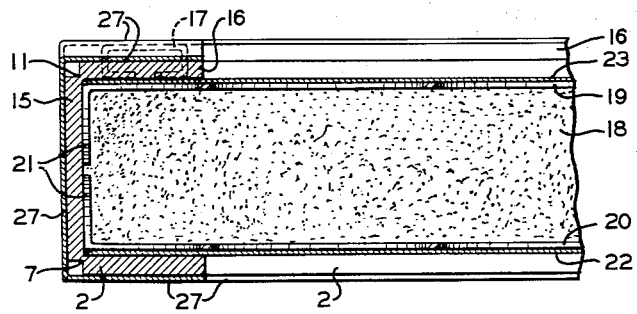
Fig. 3 is a somewhat enlarged fragmentary view in vertical section taken along the line 3—3 of Fig. 1.
Figure 4:
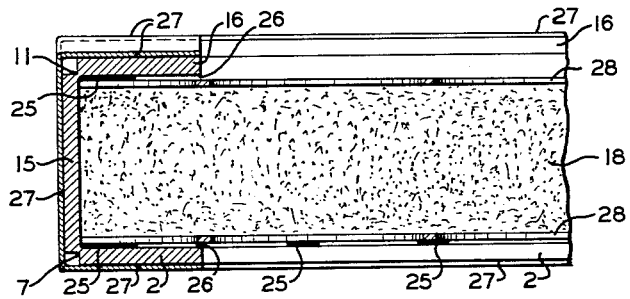
Figure 5:
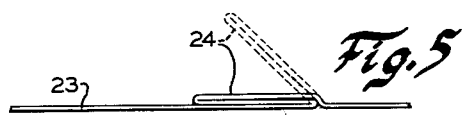

Fig. 4 is a view corresponding to that of Fig. 3 of a modified embodiment of a filter unit in accordance with this invention in which adhesive bonding of the parts is employed and provides a stiffening effect; and Fig. 5 is a fragmentary view of a detail of the protective cover shown in the embodiment of Fig. 1, the view showing the fold construction providing a tab for stripping the cover from the unit, and showing in dotted lines a typical arrangement of the tab during the stripping operation.

In accordance with the illustrated preferred embodiment of this invention, there is provided a centrally apertured unitary jacket blank 1 which is advantageously die-cut from a unit of thin sheet material, preferably chipboard.

The jacket blank 1 is constituted essentially by a rectangular bottom frame portion 2 framing a rectangular opening 2' and having marginal flap portions 3, 4, 5 and 6 which are preferably co-extensive with the respective sides of said frame portion and extend laterally outwardly therefrom for preferably equal distances.

The flap portions 3, 4, 5 and 6 are integrally foldably connected to the frame portion 2 along a set of score lines 7, 8, 9 and 10, respectively, marking the outer edges of the frame portion 2. To this end, the blank 1 is scored along these lines on its under surface as viewed in Fig. 1. The blank is also scored on its under surface along a separate set of score lines 11, 12, 13 and 14 in the flap portions 3, 4, 5 and 6, respectively. This second set of score lines divides the respective flap portions into a side frame portion 15 and a top frame portion 16 integrally foldably connected to each other along the respective score lines. The score lines 11, 12, 13 and 14 parallel the score lines 3, 4, 5 and 6, respectively, at equal distances therefrom determined by the thickness of the core or assembly to be enclosed by the jacket.

Figure 2:
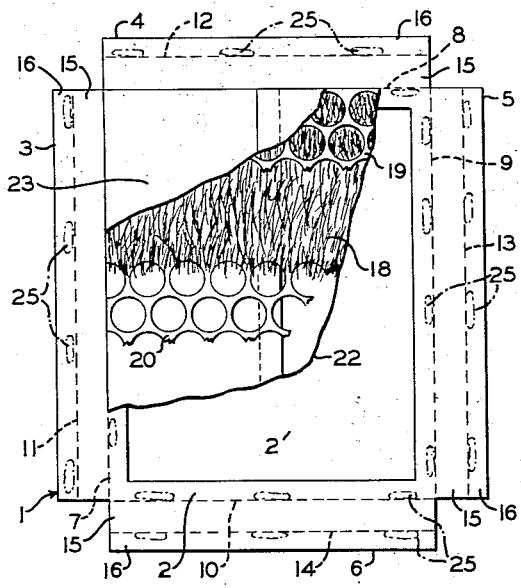
Fig. 2 is a view in plan of the embodiment of Fig. 1 in one stage of its manufacture, the view showing the several parts in their overlying assembled relationship in which the jacket blank ready for folding is the bottommost part, and the elements overlying the jacket blank are successively broken away in part to show more clearly the individual construction and arrangement of the several parts.

It will thus be apparent that by the simple expedient of bending the flap portions 3, 4, 5 and 6 upwardly out of the plane of the Fig. 2 along the score lines 7, 8, 9 and 10, respectively, to a position at right angles to the plane of the Fig. 2, and then bending the top frame portions 16 inwardly along the score lines 11, 12, 13 and 14 to a position at right angles to the side frame portions 15, the jacket blank may be formed into the rectangular jacket structure of Fig. 1 having channeled sides of U-shape in cross-section as shown in Figs. 3 and 4. The top frame portions 16 overlap each other at the corners and are secured against opening up preferably by a single wire staple 17 passing through the overlapped portions at each corner. Alternatively, the top frame portions may be adhesively bonded together and to the filter core as will be more fully described hereinafter.

The jacket structure thus formed serves as an enclosure for the filter core of the unit which core as here preferably embodied comprises a bat 18 of coated glass wool or other suitable filtering medium sandwiched between an upper apertured stiffening and retaining screen 19, preferably of metal, and a corresponding lower screen 20. Each of the filter screens 19 and 20 is preferably provided along one pair of opposite sides, corresponding to the right and left hand sides as viewed in Fig. 1, with a reinforcing and stiffening flange 21 as appears in Fig. 3. The flanges 21 on the respective sides extend inwardly toward each other for a suitable distance determined by the stiffness sought to be imparted to the filter unit.

The filter core formed by the bat 18 and the screens 19 and 20 is dimensionally of a size corresponding roughly to that of the base frame 2 of the jacket blank 1 upon which it is placed. Preferably also, a removable cover 22 which may be constituted by a single sheet of paper dimensioned to cover the base frame 2 over the opening 2' is first placed on the jacket blank 1 over the opening 2', and the filter core is then positioned on the cover 22. A similar cover 23 is placed on top of the protective plate 19 so that both faces of the core are masked by the covers 22 and 23 to prevent manual contact with the filter medium proper, and to protect the latter against contamination prior to use. Preferably, each of the covers 22 and 23 is provided with a single gripping fold 24 adapted to be grasped manually by the user just prior to installation of the filter unit, for removing the cover so as to place the filter unit in condition for use. This fold may be raised easily to a convenient grasping position such as is shown in Fig. 5.

The filter core, including the covers 22 and 23, having been placed in position on the jacket blank 1 as appears in Fig. 2, the flap portions 3, 4, 5 and 6 are folded into position, as described above, to produce the folded structure of Fig. 1. Each corner is stapled as aforesaid, and, as will be seen in the case of Fig. 3, the filter core is snugly seated at its respective sides in a U-shaped side channel formed as shown in Fig. 3 by the base frame 2, the side frame portion 15 and the top frame portion 16. The protective cover 22 is removably retained principally by friction between the stiffening and retaining screen 20 and the base frame 2, and the protective cover 23 is likewise removably retained by friction, between the stiffening and retaining screen 23 and one pair of the top frame portions 16.

In the modified embodiment of this invention depicted in Fig. 4, the use of staples has been eliminated through the employment of a suitable adhesive medium bonding the core to the jacket. To this end, the jacket blank 1 is suitably treated with a suitable quick-drying thermoplastic adhesive at convenient points. Advantageously, as indicated in Fig. 2, the adhesive may be applied at suitably spaced spots 25 to the base frame 2 and to the top frame portions 16 so that upon folding of the blank into its finished form the base frame and the top frame portions will be adhesively bonded to the metal stiffening and retaining screens 22 and 23 substantially at the margins of the latter, as is indicated in Fig. 4. It will be apparent that with the exercise of reasonable care in the application of the adhesive, whether by spotting or striping, sufficient space may be left between the adhesive line and the inner margins of the top frame portions 16 and the base frame 2, to permit of protective dust covers such as the covers 22 and 23, Fig. 2, if used, to be disposed therebetween without necessarily being adhesively bonded thereto. In Fig. 4, the dust covers have been omitted, however, in order to show clearly the available space 26 in which they are adapted to be marginally retained. Moreover, the employment of the adhesively bonded construction in lieu of or in supplement to the stapled form of filter offers the advantage that the adhesive upon setting provides a considerable measure of reinforcement and stiffening to the unit by reason of its substantial rigidity in its set state. Moreover, there is less tendency of the unit to bow or gape at the sides when damp. Hence, the use of the marginal reinforcing flanges 21 on the protective retaining screens after the manner of Fig. 3 may be dispensed with, if desired, and unflanged screens, such as the screens 28, employed.

In accordance with this invention also, the top, bottom and sides of the jacket are covered with a layer of paper or fabric in tape form, as indicated at 27 in Figs. 1, 3 and 4. Further reinforcement and stiffening of the filter unit is thus obtained and the taping also serves to prevent parting of the overlapped top frame portions 16 at the corners of the unit.

The invention in its broader aspects is not limited to the specific processes and steps described, but departures may be made therefrom within the scope of the accompanying claims without departing from the principles of the invention and without sacrificing its chief advantages.

Having thus described this invention, what is claimed is:

1. An air filter unit comprising a central, one-piece, integral, substantially rectangular frame portion having a substantially rectangular opening therein of dimensions less than that of said frame portion, a filter core positioned in superimposed relationship on said frame portion to bridge said opening and to overlap the contact portions of said central frame portion marginal to said opening, said core having substantially the same dimensions as said frame portion, four rectangular wing portions integrally secured only along one side to each peripheral side edge of said central frame portion and folded along a first fold line upwardly and at substantially right angles to said frame portion and engaging the peripheral side surfaces of said filter core, each of such wing portions having its remaining peripheral edges free relative to said central frame portion, the top free ends of said wing portions folded inwardly along a second fold line spaced from and parallel to said first fold line to a position substantially parallel to said central frame portion and overlying the top surface of said filter core for a distance inwardly corresponding to the contact portion of said central frame portion marginal to the opening therein, and means for securing said folded wing portions in their folded position.

2. A filter unit in accordance with claim 1 in which the folded wing portions are adhesively united in their folded position.

3. A filter unit in accordance with claim 1 in which said filter core comprises a pair of metal screens and a filter medium sandwiched therebetween, at least one of said screens being provided with a reinforcing flange along at least one of its sides.

4. An air filter unit in accordance with claim 1 in which protective paper sheets are removably positioned on opposite faces of the filter core between the core and the central frame portion on one side and the folded wing portion on the other.

References Cited in the file of this patent

UNITED STATES PATENTS

| | | |
|---|---|---|
| 2,080,726 | Lowinger | May 18, 1937 |
| 2,138,874 | Myers | Dec. 6, 1938 |
| 2,408,659 | Lamb | Oct. 1, 1946 |
| 2,581,733 | Trask | Jan. 8, 1952 |
| 2,659,003 | Russell | May 19, 1953 |
| 2,664,172 | Butterfield | Dec. 29, 1953 |

FOREIGN PATENTS

| | | |
|---|---|---|
| 482,543 | Great Britain | Mar. 31, 1938 |